United States Patent
Bletscher et al.

(10) Patent No.: US 10,214,087 B2
(45) Date of Patent: Feb. 26, 2019

(54) GROUND PROCESSING MACHINE, IN PARTICULAR COMPACTOR

(71) Applicant: Hamm AG, Tirschenreuth (DE)

(72) Inventors: Thomas Bletscher, Bechtsried (DE); Gerd Koestler, Tirschenreuth (DE); Martin Fischer, Bärnau (DE); Michael Zimmerer, Immenreuth (DE); Thomas Bauer, Immenreuth (DE)

(73) Assignee: Hamm AG, Tirschenreuth (DE)

( * ) Notice: Subject to any disclaimer, the term of this patent is extended or adjusted under 35 U.S.C. 154(b) by 0 days.

(21) Appl. No.: 14/971,078

(22) Filed: Dec. 16, 2015

(65) Prior Publication Data

US 2016/0176278 A1 Jun. 23, 2016

(30) Foreign Application Priority Data

Dec. 18, 2014 (DE) .......................... 10 2014 118 995

(51) Int. Cl.
*B60K 5/00* (2006.01)
*B60K 15/063* (2006.01)
(Continued)

(52) U.S. Cl.
CPC .............. *B60K 5/00* (2013.01); *B60K 15/063* (2013.01); *B60R 99/00* (2013.01); *E01C 19/266* (2013.01);
(Continued)

(58) Field of Classification Search
CPC .................... B60K 5/00; B60K 15/063; B60K 2015/0638; E02D 3/02; E01C 19/266; B60R 99/00
See application file for complete search history.

(56) References Cited

U.S. PATENT DOCUMENTS

| 6,408,969 B1 * | 6/2002 | Lobert | ................... B60K 11/08 165/41 |
| D668,269 S † | 10/2012 | Tezuka | |

(Continued)

FOREIGN PATENT DOCUMENTS

| CA | 2042890 A | 11/1992 |
| DE | 11 2009 001 430 | 5/2011 |

(Continued)

OTHER PUBLICATIONS

Levine, Mike; Real World Challenges with Diesel Exhaust Fluid; Jul. 19, 2010; <http://news.pickuptrucks.com/2010/07/real-world-challenges-with-diesel-exhaust-fluid.html>.*

(Continued)

*Primary Examiner* — James A Shriver, II
*Assistant Examiner* — Brian Cassidy
(74) *Attorney, Agent, or Firm* — Rankin, Hill & Clark LLP (57) ABSTRACT

A ground processing machine includes a rear carriage with an internal combustion engine, respectively at least one drive wheel to both sides of the internal combustion engine, a driver cabin arranged offset relative to the internal combustion engine in the longitudinal direction of the machine, a fuel tank for fuel to be supplied to the internal combustion engine, an additive substance tank, and a hydraulic fluid tank. The additive substance tank is arranged following a drive wheel in the longitudinal machine direction, and next to the drive wheel in a transversal machine direction.

6 Claims, 5 Drawing Sheets

(51) Int. Cl.
    *E02D 3/026*     (2006.01)
    *E01C 19/28*     (2006.01)
    *E02F 9/08*     (2006.01)
    *B60R 99/00*     (2009.01)
    *E01C 19/26*     (2006.01)
    *E02D 3/02*     (2006.01)

(52) U.S. Cl.
    CPC .............. *E01C 19/28* (2013.01); *E02D 3/02* (2013.01); *E02D 3/026* (2013.01); *E02F 9/0883* (2013.01); *B60K 2015/0638* (2013.01)

(56) References Cited

U.S. PATENT DOCUMENTS

| | | | |
|---|---|---|---|
| 8,661,793 B2* | 3/2014 | Yamashita | B60K 13/04 60/286 |
| 8,905,182 B2* | 12/2014 | Masumoto | B60K 11/06 180/309 |
| 8,936,122 B2* | 1/2015 | MacGregor | B60K 11/04 180/68.1 |
| 9,003,779 B2* | 4/2015 | Kanamori | F01N 3/208 60/295 |
| 9,046,018 B2* | 6/2015 | Herzberg | F01N 3/0842 |
| 2012/0067660 A1 | 3/2012 | Kashu et al. | |
| 2013/0108367 A1† | 5/2013 | Bornemann | |
| 2013/0292386 A1 | 11/2013 | Klauer et al. | |
| 2013/0305717 A1* | 11/2013 | Roehr | E02D 3/026 60/605.2 |
| 2014/0290224 A1* | 10/2014 | Kanamori | F01N 3/208 60/295 |
| 2015/0022334 A1* | 1/2015 | Guillory | B60Q 1/50 340/450 |
| 2016/0082830 A1* | 3/2016 | Okamura | F01N 3/2066 180/309 |
| 2016/0146079 A1* | 5/2016 | Tanaka | E02F 9/0883 60/301 |

FOREIGN PATENT DOCUMENTS

| | | |
|---|---|---|
| DE | 112009001430 T5 | 5/2011 |
| DE | 102012112666 B3 | 3/2014 |
| EP | 1736350 A2 | 12/2006 |
| EP | 002009308-0001 † | 3/2012 |
| EP | 2431536 | 3/2012 |
| EP | 2431536 A1 | 3/2012 |
| EP | 2 474 672 | 7/2012 |
| EP | 2474672 A1 | 7/2012 |
| EP | 2479393 A1 | 7/2012 |
| EP | 2 754 870 | 1/2013 |
| EP | 2754870 A1 | 7/2014 |
| JP | 2000-192415 | 7/2000 |
| JP | 2002-242121 | 8/2002 |
| JP | 2012-158892 | 8/2012 |
| JP | 2013249663 A | 12/2013 |
| JP | 2013249665 A | 12/2013 |

OTHER PUBLICATIONS

Search Report of EP Application No. 15199708 dated May 4, 2016, 6 pages.
German Search Report dated Oct. 28, 2015.
Letter from Lang & Tomerius to Hamm AG dated Mar. 2, 2016, 7 pages (w/ English Translation).
Brochure, Souveäne Technik. Optimale Verdichtung. Tandemwalzen knickgelenkt, AB 5 t, BOMAG GmbH, Sep. 2014, 28 pages—cited in EP Opposition.
Brochure, "Fendt 300 Vario", AGCO GmbH, Mar. 2014, 17 pages—cited in EP Opposition.
Excerpt "Operators's Manual ZAXIS Hydraulic Excavator", Hitachi Construction Machinery Co., Jan. 2009, 6 pages—cited in EP Opposition.
Article "Real World Challenges with Diesel Exhaust Fluid", http://news.pickuptrucks.com/2010/07/real-world-challenges-with, Jul. 19, 2010, 7 pages—cited in EP Opposition.
Article "Bagger", https://de.wikipedia.org/w/index.php?title=Bagger&oldid=1363237, Nov. 2014, 17 pages—cited in EP Opposition.
Eidesstattliche Versicherung von Herrn Matthias Wolfram (per separater Eingabe), Jun. 25, 2017, 6 pages—cited in EP Opposition.
Jackson, "Everything you need to know about Tier 4 Final", https://www.equipmentworld.com/everything-you-need-to-know-ab, Oct. 1, 2013, 4 pages—cited in EP Opposition.
"Radlader", https://de.wikipedia.org/w/index.php?title=Radlader&oldid=134871546, Oct. 2014, 3 pages—cited in EP Opposition.
Advisory Action of U.S. Appl. No. 14/971,078 dated Jan. 18, 2018, 3 pages—cited in EP Opposition.
Maintenance Manual, 3412/3412P/3412HT/3414/3414P/3414HT, Hamm AG, Oct. 2000, 31 pages—cited in EP Opposition.
"Hamm 3412 HT VIO", Machinery Park International, https://de.machinerypark.com/walzenzug-hamm-3412-ht-vio-geb, 2013, 4 pages—cited in EP Opposition.
"Grenzwerte für Mobile Maschinen und Gerate, Baumaschinen und Traktoren nach Richtlinie 97/68/EG", https://www.umweltbundesamt.de/themen/verkehr-laerm/emissionsstandards/maschinen-geraete, Aug. 18, 2016, 1 page—cited in EP Opposition.
Article, "Die neue Abgasstufe ist für Baumaschinenhersteller eine große Herausforderu" BauPortal, Nov. 2011, 1 page—cited in EP Opposition.
Article, "Die neue Abgasstufe: für Baumaschinenhersteller eine große Herausforderung" Steine & Areden, Apr. 2011, 3 pages—cited in EP Opposition.
Annex to opposition filed in EP303434761, Jan. 18, 2016, 1 page—cited in EP Opposition.
Opposition of EP 15199708.7 dated Feb. 15, 2018, 57 pages.
English translation of Opposition of EP 15199708.7 dated Feb. 15, 2018, 53 pages.
Sakai Heavy Industries, Ltd., R2-1 Series 3-Wheel Roller, 2 pages, Printed 2005, Japan.†

\* cited by examiner
† cited by third party

GROUND PROCESSING MACHINE, IN PARTICULAR COMPACTOR

The present invention concerns a ground processing machine, in particular a compactor, that may be used to implement ground processing operations, for example for compacting asphalt material, gravel material or earth.

Such a compactor is generally constructed with a rear carriage on which respectively at least one drive wheel is provided to both sides of an internal combustion engine. At a front carriage that may be pivoted relative to the rear carriage, a ground processing roller (a compacting roller, for example) is rotatable around a roller rotation axis which extends essentially in a transversal machine direction.

In order to be able to satisfy the ever stricter requirements with regard to pollution emissions, in such machines an additive substance (urea, for example) is added to the exhaust gases emitted from their internal combustion engines (generally a diesel generator). Chemical reactions which lead to a reduced nitrogen oxide emission may then run under the conversion of the additive substance in a catalyst arrangement provided in the exhaust flow path.

From EP 2 754 870 A1, a chain-driven construction machine is known which has a diesel internal combustion engine as a power plant. An additive substance tank is arranged in the region of this internal combustion engine. In order to protect this additive substance tank (or, respectively, the additive substance contained therein) positioned near the internal combustion engine from overheating (and a decomposition that would thereby be induced), various measures may be taken for cooling or, respectively, to avoid an excessive warming of the additive substance. For example, the additive substance tank may be embedded in an insulating housing. Circulating coolant medium around the additive substance tank is also possible.

It is the object of the present invention to provide a ground processing machine, in particular a compactor which, given optimal utilization of structural space, enables a positioning of an additive substance tank that avoids an excessive warming.

According to the invention, this task is solved via a ground processing machine, in particular a compactor, comprising:
- a rear carriage with an internal combustion engine,
- respectively at least one drive wheel to both sides of the internal combustion engine,
- a driver cabin arranged offset relative to the internal combustion engine in the longitudinal direction of the machine,
- a fuel tank for fuel to be supplied to the internal combustion engine,
- an additive substance tank,
- a hydraulic fluid tank.

Given a ground processing machine of such a design, according to the invention it is additionally provided that the additive substance tank is arranged following a drive wheel in the longitudinal direction of the machine, and essentially next to the drive wheel in a transversal direction of the machine.

Given such a positioning of the additive substance tank, this is positioned comparably far away from the internal combustion engine, and is protected at least in areas against heat transfer by the drive wheel relative to the internal combustion engine. Given such a positioning, the additive substance tank is also situated in a region that is essentially lateral to the rear carriage, and thus is easily accessible, in particular for filling of said additive substance tank.

For example, it may thereby be provided that the additive substance tank is arranged immediately following the drive wheel in the longitudinal machine direction. A compact design is thus achieved given which it is not, however, precluded that a protective plate covering the drive wheel, or something similar, is situated between the drive wheel and the additive substance tank. However, according to the invention no additional tank is situated in this area.

If the additive substance tank is arranged in the longitudinal machine direction between the drive wheel and the hydraulic fluid tank, a compact design is enabled given a similarly easy accessibility to the hydraulic fluid tank for refilling hydraulic fluid.

In an alternative embodiment, it may be provided that the hydraulic fluid tank is arranged in the longitudinal machine direction between the drive wheel and the additive substance tank. Here, for example, the hydraulic fluid tank thus immediately follows the drive wheel and thus shields the additive substance tank even better from the internal combustion engine.

The additive substance tank and the hydraulic fluid tank may thereby be arranged essentially next to one another in the transversal machine direction, which enables the easy accessibility to both of these tanks on the same side of the rear carriage.

In a development of the ground processing machine, an efficient utilization of structural space may be achieved in that the additive substance tank and/or the hydraulic fluid tank is arranged at least in areas below the driver cabin.

The fuel tank may be arranged following the internal combustion engine in the longitudinal machine direction, and in a central region of the rear carriage in the transversal machine direction. The additive substance tank and the fuel tank may thereby be arranged overlapping at least in part in the longitudinal machine direction.

In particular given such closely situated positioning of the additive substance tank and the fuel tank, it may additionally be provided that a fuel tank filler neck of the fuel tank extends at least in areas between the additive substance tank and the drive wheel. As a result of this, a positioning may be achieved in which a fill opening of the fuel tank and/or a fill opening of the additive substance tank and/or a fill opening of the hydraulic fluid tank are arranged essentially following one another on the same side of the rear carriage and/or in the longitudinal machine direction. The fill openings of the fuel tank and of the additive substance tank are thus easily accessible on the same side of the rear carriage.

In particular given a design of the ground processing machine as a compactor, a front carriage may be connected with the rear carriage so as to be pivotable, wherein a ground processing roller at the front carriage can be rotated around a roller rotation axis that extends essentially in the transversal machine direction.

The present invention is described below in detail with reference to accompanying Figures. Shown are.

Figure 1:
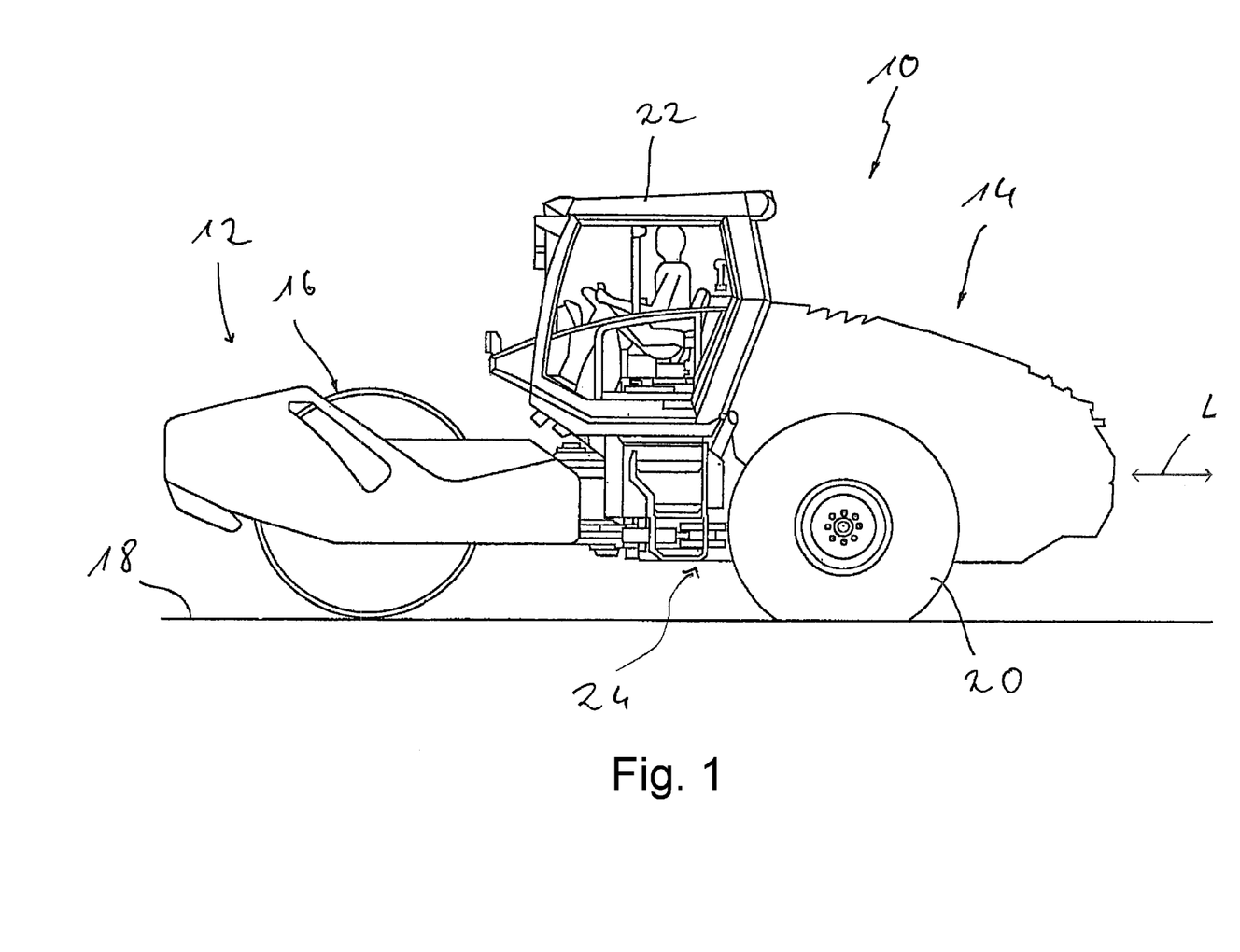
FIG. 1 a side view of a ground processing machine executed as a compactor.
Figure 2:
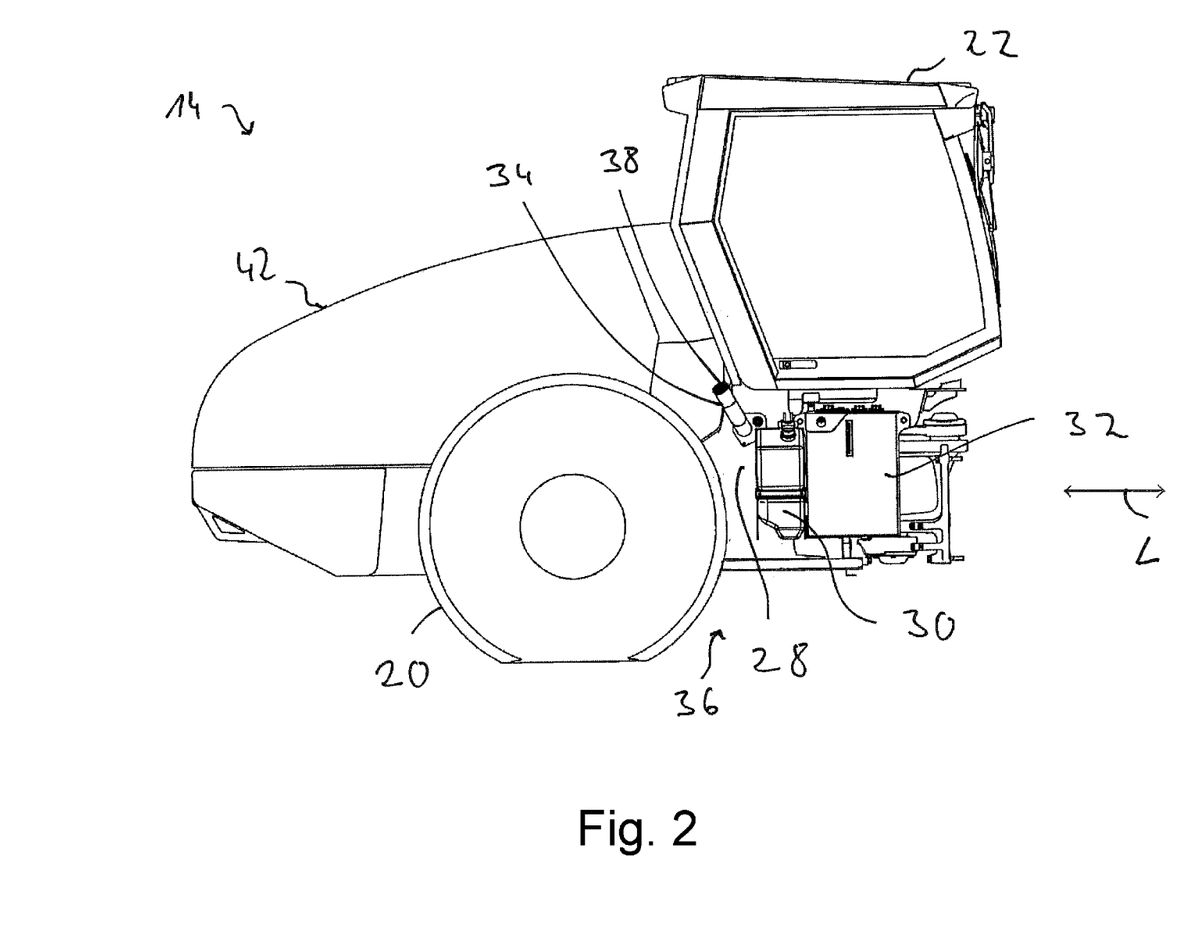
FIG. 2 a side view of a rear carriage.
Figure 3:
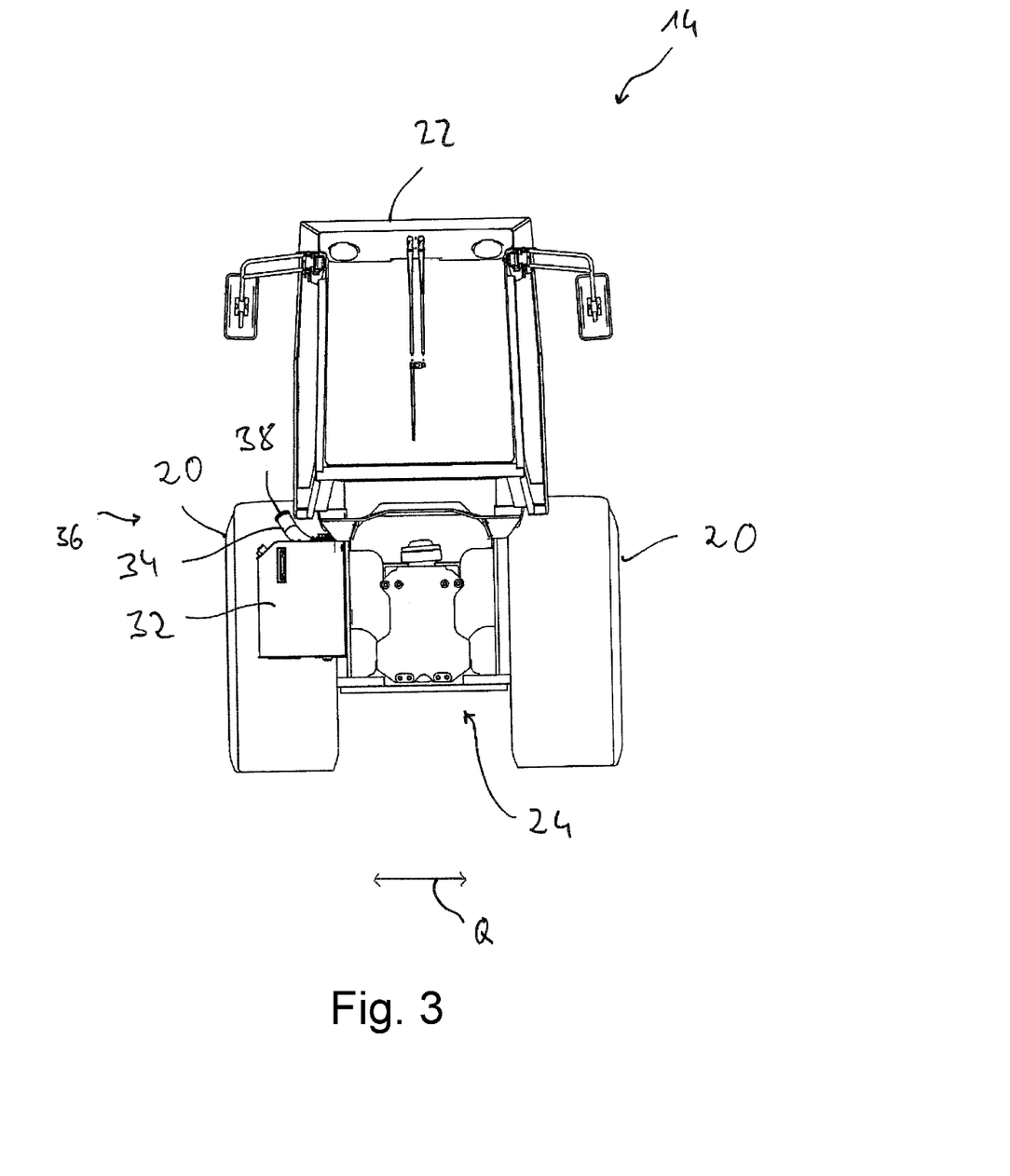
FIG. 3 a front view of the rear carriage.
Figure 4:
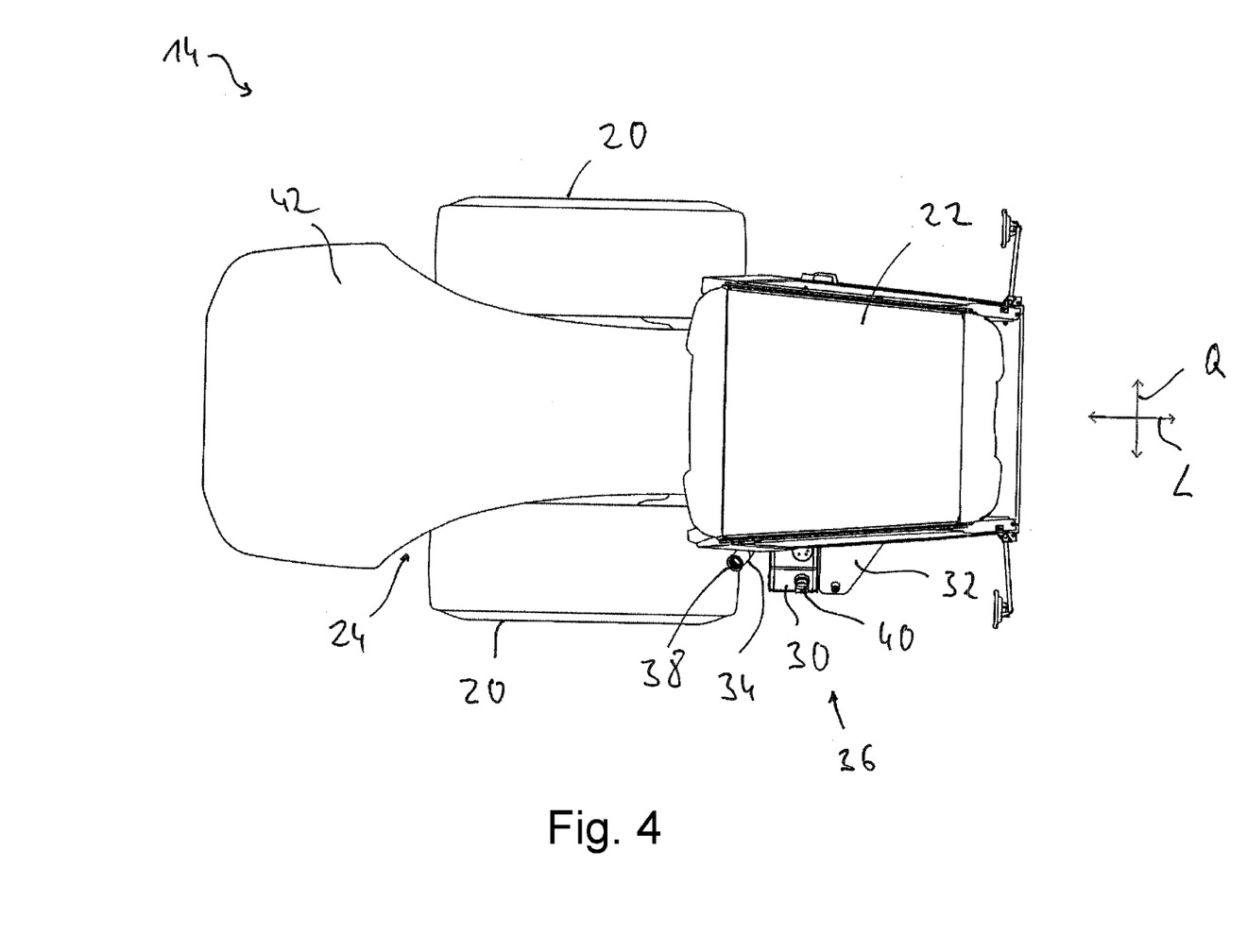
FIG. 4 a plan view of the rear carriage.

The ground processing machine 10 executed as a compactor comprises a front carriage 12 and a rear carriage 14 connected with this so as to be pivotable. A ground processing roller 16 for processing for example compacting a ground 18 is borne at the front carriage 12 such that it can rotate around a roller rotation axis. Drive wheels 20 and a driver cabin 22 are provided at the rear carriage 14. The drive wheels 20 are arranged to both sides of an internal combustion engine described further in the following of a drive system 24.

FIGS. 2 through 5 show the relative positioning of different system regions at the rear carriage 14 relative to a longitudinal machine direction L and a transversal machine direction Q. For example, FIG. 5 thus shows the internal combustion engine 26 of the drive system 24, arranged essentially in a central region in the transversal machine direction Q. The internal combustion engine 26 supplies the power required for the operation of the ground processing machine 10. This power may either [sic] be stored in a power storage using a generator arrangement, from which electrically operated motors—for example for the travel drive, an imbalance drive or the like—are then fed. A hydraulic system may also be operated via the internal combustion engine 26 in order to feed hydraulic motors, for example for the travel drive or to operate various assemblies of the ground processing machine 10.

Figure 5:
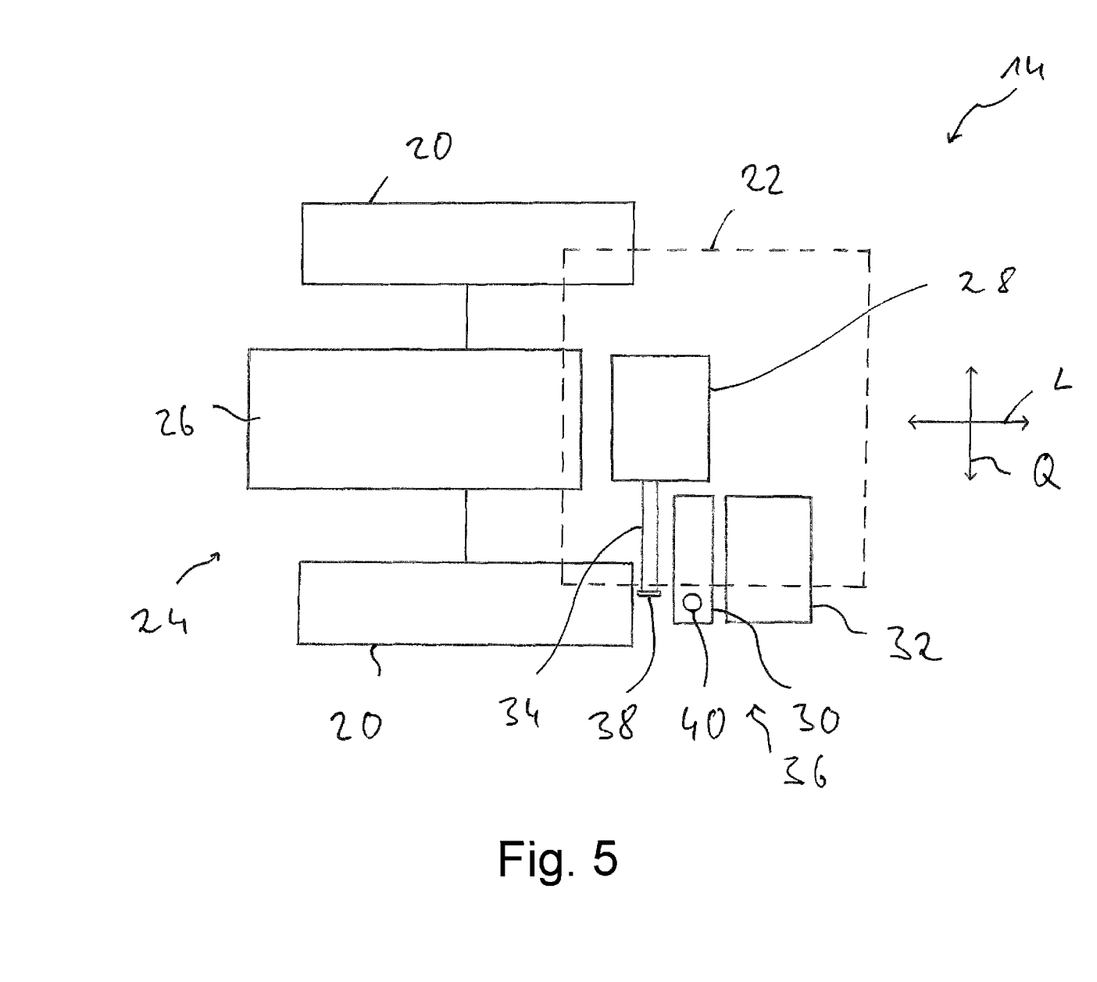
FIG. 5 a principle presentation which shows the relative position of various system regions at the rear carriage.

In the longitudinal machine direction L, the drive wheels 20 are situated to both sides of the internal combustion engine 26, which is arranged in a central region in the transversal machine direction Q. Illustrated in FIG. 5 is the driver cabin 22, which is situated offset relative to the internal combustion engine 26 in the longitudinal machine direction L but may at least partially overlap this. Relative to a direction that is to be considered as a forward travel direction in a normal travel operation, which is a movement direction to the left in FIG. 1, the driver cabin 22 is situated essentially before the internal combustion engine 26 or, respectively, between the internal combustion engine 26 and the ground processing roller 16.

A fuel tank 28 for the fuel (thus for example diesel fuel) which is to be supplied to the internal combustion engine 26 is likewise situated following the internal combustion engine 26, in a central region in the transversal machine direction Q and in the longitudinal machine direction L. The internal combustion engine 26 and the fuel tank 28 thus are situated one following the other in the longitudinal machine direction L. The fuel tank 28 is essentially positioned centrally and below the driver cabin 22.

In the longitudinal machine direction L, an additive substance tank 30 is arranged following the drive wheel 20, which, in FIG. 5, is positioned below and to the right relative to a normal forward travel direction. This is offset to the outside in the transversal machine direction Q, relative to a central region, and thus overlaps with the drive wheel 20 positioned next to the additive substance tank 30 in the transversal machine direction Q. Here the additive substance tank 30 is arranged immediately following the drive wheel 20. No additional tank is situated between these. The positioning of the additive substance tank 30 relative to the fuel tank 28 is thereby such that the additive substance tank 30 follows the fuel tank 28 in the transversal machine direction Q, moving out from the central region, and in the longitudinal machine direction L the additive substance tank 20 overlaps with the fuel tank 28, essentially is arranged next to this.

In the longitudinal machine direction L, a hydraulic fluid tank 32 is provided following the additive substance tank. In the transversal machine direction Q, this is essentially situated next to the additive substance tank 30 and essentially overlaps with this, such that the additive substance tank 30 is essentially situated between the drive wheel 20 and the hydraulic fluid tank 32 in the longitudinal machine direction L.

A fuel tank filler neck 34 of the fuel tank 28 is positioned so that it extends out from the fuel tank 28, which is essentially positioned centrally in the transversal machine direction Q to that side 36 of the rear carriage 14 at which the additive substance tank 30 and the hydraulic fluid tank 32 are positioned. The fuel tank filler neck 34 is thus essentially situated between the additive substance tank 30 and the drive wheel 20 and, as FIG. 2 clarifies, may overlap in areas with the drive wheel 20 in the longitudinal machine direction L. With this positioning of the fuel tank filler neck 34, an arrangement is achieved given which a fuel tank fill opening 38 provided at this fuel tank filler neck 34 is essentially positioned next to an additive substance fill opening 40 of the additive substance tank 30 or, respectively is positioned near this in the transversal machine direction Q. The fuel tank fill opening 38 and the additive substance fill opening 40 are thus situated on the same side 36 of the rear carriage 14 and are easily accessible for filling of the respective liquid substances. A fill opening of the hydraulic fluid tank 32 may also be arranged on this side 36 and following the other fill openings in the longitudinal machine direction L.

FIGS. 2 through 5 additionally show not only that the centrally positioned fuel tank 28 is essentially situated under the driver cabin 22, but that the driver cabin 22 essentially overlaps the additive substance tank 30 and also the hydraulic fluid tank 32 in the longitudinal machine direction L, and also in the transversal machine direction Q. Via the positioning of the additive substance tank 30 and the hydraulic fluid tank 32 in a region below and overlapping with the driver cabin 22, the structural space present there is thus used efficiently. At the same time, a protection for the additive substance tank 30 and the hydraulic fluid tank 32 from effects from above or, respectively, the rear is achieved via the driver cabin 22 and also the drive wheel 20. In order to be able to protect these tanks, in particular the additive substance tank) from external influences, for example also from excessive solar radiation and therefore excessive warming, a covering not shown in Figures may additionally be provided which covers the additive substance tank 30 and also possibly the hydraulic fluid tank 32 like a box and, for example, may have a clearance in the region of respective fill openings, or may be removable in regions or entirely.

Given a compact embodiment and efficient utilization of structural space, an easy accessibility to the various tanks for filling (possibly also to check the fill levels) is on the one hand ensured via the relative positioning of the various tanks with regard to the drive unit 26, with regard to the driver cabin 22 and also with regard to one of the drive wheels 20. At the same time, a protective effect is provided in particular by surrounding the additive substance tank 30 and the hydraulic fluid tank 32 with other system components of the rear carriage. Although the additive substance tank 30 also shielded in part by the fuel tank 28 and the drive wheel 20 is situated comparably close to the internal combustion engine 26, it is thermally well shielded with regard to this. This also enables a comparably short flow path for the additive substance between the additive substance tank 30 and an exhaust gas conduit system leading out from the internal combustion engine 26, for example in a region behind the driver cabin 22.

Since the fill openings for the fuel tank 28 and also the additive substance tank 30 are situated in a region which is generally not covered by a cover hood 42 for the internal combustion engine 26, it is also not necessary to move this cover hood 42 in order to fill these tanks.

The invention claimed is:

1. Ground compactor, comprising:
    a rear carriage with an internal combustion engine, respectively a drive wheel to both sides of the internal combustion engine,
    a driver cabin arranged offset relative to the internal combustion engine in a longitudinal direction of the machine which is along a forward travel direction of the ground compactor,
    a front carriage is connected with the rear carriage so as to be pivotable, wherein at the front carriage a floor processing roller can be rotated around a roller rotation axis extending in the transversal machine direction,
    a fuel tank for fuel to be supplied to the internal combustion engine,
    an additive substance tank,
    a hydraulic fluid tank,
    wherein the fuel tank is arranged next to the internal combustion engine in the longitudinal machine direction, and in a central region of the rear carriage in the transversal machine direction,
    wherein the additive substance tank is arranged next to one of the drive wheels in the longitudinal machine direction, and overlapping to the one drive wheel in a transversal machine direction, and is arranged next to the fuel tank and not overlapping the fuel tank in the longitudinal machine direction,
    wherein a fuel tank filler neck of the fuel tank is arranged with its length direction extending in the transversal machine direction at least in areas between the additive substance tank and the one drive wheel,
    wherein the additive substance tank and the fuel tank are arranged overlapping at least in part in the longitudinal machine direction.

2. Ground compactor according to claim 1, wherein the additive substance tank is arranged immediately adjacent the one drive wheel in the longitudinal machine direction.

3. Ground compactor according to claim 1, wherein the additive substance tank is arranged between the one drive wheel and the hydraulic fluid tank in the longitudinal machine direction.

4. compactor according to claim 1, wherein the additive substance tank and the hydraulic fluid tank are arranged next to one another in the longitudinal machine direction and overlapping each other in the transversal machine direction.

5. Ground compactor according to claim 1, wherein the additive substance tank and/or the hydraulic fluid tank are arranged at least in areas below the driver cabin.

6. Ground compactor according to claim 1, wherein a fill opening of the fuel tank and a fill opening of the additive substance tank and a fill opening of the hydraulic fluid tank are arranged following one another on the same side of the rear carriage in the longitudinal machine direction.

* * * * *

UNITED STATES PATENT AND TRADEMARK OFFICE
CERTIFICATE OF CORRECTION

PATENT NO. : 10,214,087 B2
APPLICATION NO. : 14/971078
DATED : February 26, 2019
INVENTOR(S) : Thomas Bletscher et al.

Page 1 of 1

It is certified that error appears in the above-identified patent and that said Letters Patent is hereby corrected as shown below:

In the Claims

Claim 1, Column 5, Line 29, "longitudinal" should be changed to --transversal--.

Signed and Sealed this
Tenth Day of December, 2019

Andrei Iancu
*Director of the United States Patent and Trademark Office*